ured Ketones Richard Norman Lacey, Hull, England, assignor to The Distillers Company Limited, Edinburgh, Scotland, a British company
No Drawing. Filed Dec. 17, 1959, Ser. No. 860,082
Claims priority, application Great Britain Jan. 14, 1959
4 Claims. (Cl. 260—595)

The present invention relates to the production of organic compounds and in particular to the production of unsaturated ketones.

According to the present invention, the process of producing an unsaturated ketone representable by the formula

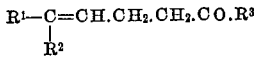

comprises contacting an allyl acetoacetate representable by the formula

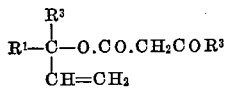

with an aluminium tri-carboxylate, wherein $R^1$ and $R^2$ are alkyl groups or hydrogen atoms and $R^3$ is a lower alkyl group.

The allyl acetoacetate may be contacted with the aluminium tri-carboxylate with advantage at an elevated temperature, preferably at a temperature in the range from 100° to 300° C. The temperature used in any particular embodiment of the invention depends on the nature of the allyl acetoacetate heated; if, for instance, the allyl acetoacetate is methylbutenyl acetoacetate, it may be heated at a temperature from 110° to 170° C., preferably from 140° to 170° C. The allyl acetoacetate is conveniently heated with the aluminium tri-carboxylate in an apparatus which enables a steady stream of carbon dioxide to be evolved and removed.

The aluminium tri-carboxylate used in the process of the invention may be, for example, aluminium triacetate, basic aluminium triacetate $(CH_3.COO)_4.OAl_2.4H_2O$, aluminium tributyrate, aluminium trioctanoate, aluminium trilaurate, aluminium tripalmitate or aluminium tristearate. Aluminium tri-carboxylates containing more than one carboxylic acid residue, such as aluminium diacetate monopropionate or aluminium acetate propionate butyrate are also included in the invention. Furthermore, one or more of the fatty acid residues in the aluminium tri-carboxylate may be unsaturated, for example as in aluminium trioleate.

The following examples further illustrate the invention.

Examples 1 to 5

A series of 500 gram samples of methylbutenyl acetoacetate of 94% purity were heated with an aluminium tri-carboxylate in a reactor fitted with a stirrer and a gas outlet at 140° C., the temperature then being raised gradually to 170° C. A steady stream of carbon dioxide was evolved from the pyrolysis of the methylbutenyl acetoacetate, leaving methylheptenone in the reactor.

The nature and weight of the aluminium tri-carboxylate, the temperature to which the mixture of methylbutenyl acetoacetate and the aluminium tri-carboxylate was heated and the yield of methyl heptenone produced based on the methylbutenyl acetoacetate, are shown in the following table. In the table is also included, as a comparison, the yield of methylheptenone obtained under the same conditions except that no aluminium tri-carboxylate was present.

| Example | Catalyst | Weight of catalyst (grams) | Weight of methyl-heptenone produced (grams) | Yield of methyl-heptenone, percent |
|---|---|---|---|---|
| 1 | None | | 215 | 63.5 |
| | Aluminium triacetate | 8.8 | 251 | 74 |
| 2 | ----do---- | 13.2 | 251 | 74 |
| 3 | Basic aluminium triacetate $(CH_3.COO)_4.OAl_2.4H_2O$. | 8.3 | 253 | 74.5 |
| 4 | Basic aluminium triacetate $(CH_3.COO)_4.OAl_2.4H_2O$. | 12.3 | 245 | 72.1 |
| 5 | Aluminium tristearate | 38 | 244 | 72.1 |

I claim:
1. A process of producing an unsaturated ketone having the formula

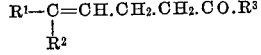

which comprises contacting at a temperature in the range of 100° to 300° C. an allyl acetoacetate having the formula

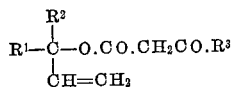

with an aluminium tri-carboxylate derived from a fatty acid having 2 to 18 carbon atoms in the fatty acid molecule, wherein $R^1$ and $R^2$ are selected from the group consisting of alkyl groups and hydrogen atoms, and $R^3$ is a lower alkyl group.

2. A process claimed in claim 1 wherein the aluminium compound is aluminium triacetate.

3. A process claimed in claim 1 wherein the aluminium compound is basic aluminium triacetate.

4. A process claimed in claim 1 wherein the aluminium compound is aluminium tristearate.

References Cited in the file of this patent

UNITED STATES PATENTS 2,795,617 Kimel et al. _____ June 11, 1957
2,839,579 Kimel et al. _____ June 17, 1958